(12) United States Patent
Bone et al.

(10) Patent No.: US 10,190,004 B2
(45) Date of Patent: Jan. 29, 2019

(54) PEELABLE COATING

(71) Applicant: Skudo Group Pty Ltd, Robina, QLD (AU)

(72) Inventors: Christopher Peter Bone, Tallai (AU); Alois Helbling, Hope Island (AU)

(73) Assignee: Skudo Group Pty Ltd, Robina (AU)

( * ) Notice: Subject to any disclaimer, the term of this patent is extended or adjusted under 35 U.S.C. 154(b) by 63 days.

(21) Appl. No.: 15/204,972

(22) Filed: Jul. 7, 2016

(65) Prior Publication Data

US 2016/0319136 A1    Nov. 3, 2016

Related U.S. Application Data

(62) Division of application No. 14/347,640, filed on Mar. 27, 2014, now abandoned.

(51) Int. Cl.
| | |
|---|---|
| *C09D 5/20* | (2006.01) |
| *C04B 26/02* | (2006.01) |
| *C04B 40/04* | (2006.01) |
| *C04B 14/06* | (2006.01) |
| *C04B 14/28* | (2006.01) |
| *C04B 14/30* | (2006.01) |
| *C04B 38/10* | (2006.01) |
| *C04B 24/38* | (2006.01) |
| *C04B 24/26* | (2006.01) |
| *C04B 111/00* | (2006.01) |

(52) U.S. Cl.
CPC ............... *C09D 5/20* (2013.01); *C04B 26/02* (2013.01); *C04B 40/04* (2013.01); *C04B 2111/00612* (2013.01)

(58) Field of Classification Search
USPC ... 156/247, 307.1, 307.3, 307.5, 307.7, 701, 156/711, 714
See application file for complete search history.

(56) References Cited

U.S. PATENT DOCUMENTS

| | | | | | |
|---|---|---|---|---|---|
| 3,819,463 | A | * | 6/1974 | Ervin | C08J 9/32 156/72 |
| 5,019,195 | A | * | 5/1991 | Skinner | B09B 3/0025 156/278 |
| 5,190,818 | A | * | 3/1993 | Sakai | C09J 7/045 428/355 AC |
| 6,194,064 | B1 | * | 2/2001 | Keely | C09J 9/00 428/317.1 |
| 2007/0215271 | A1 | * | 9/2007 | McClintic | B29C 63/02 156/247 |
| 2011/0250401 | A1 | * | 10/2011 | Dudley | H01L 21/02096 428/161 |
| 2012/0222805 | A1 | * | 9/2012 | Shintani | C09J 7/0289 156/240 |

* cited by examiner

*Primary Examiner* — Sing P Chan
(74) *Attorney, Agent, or Firm* — Bakos & Kritzer

(57) ABSTRACT

A peelable coating and method of applying to a substrate. The peelable coating comprising: a base layer that can be peelable applied to the substrate; and a pre-manufactured reinforcing layer for applying atop the base layer. The peelable coating base layer can be a liquid applied base layer having a peelable property when dry.

17 Claims, 12 Drawing Sheets

PEELABLE COATING

FIELD OF THE INVENTION

The present invention relates to coatings and in particular to peelable coating.

The invention has been developed primarily for use as a peelable coating for protecting a floor substrate and will be described hereinafter with reference to this application. However, it will be appreciated that the invention is not limited to this particular field of use.

BACKGROUND OF THE INVENTION

Any discussion of the prior art throughout the specification should in no way be considered as an admission that such prior art is widely known or forms part of the common general knowledge in the field.

Known peelable coating systems include a release coating applied to the floor surface and a durable coating applied to the release coating. This requires the durable coating being directly applied to the release coating.

OBJECT OF THE INVENTION

It is an object of the present invention to overcome or ameliorate at least one of the disadvantages of the prior art, or to provide a useful alternative.

It is an object of the invention in its preferred form to provide a peelable coating, and method of application, that can be used on a variety of floor substrates.

SUMMARY OF THE INVENTION

According to the invention there is provided a 'wet' peelable coating system for applying to a substrate. According to the invention there is provided a 'dry' peelable coating system for applying to a substrate.

According to the invention there is provided a peelable coating system for applying to a substrate, the peelable coating system comprising:
  a liquid applied base layer (or wet base coat system) having a peelable property when dry; and
  a pre-manufactured reinforcing layer for applying atop the base layer.

Preferably, a pre-manufactured reinforcing layer has one or more applied upper coating layers.

According to an aspect of the invention there is provided a method of applying a peelable coating to a substrate, the method comprising the steps of:
  applying a liquid applied base layer (or wet base coat system) to the substrate, the base layer having a peelable property when dry;
  applying a pre-manufactured reinforcing layer atop the base layer.

Preferably, the method includes the step of: applying a coating layer atop the reinforcing layer when in-situ.

According to an aspect of the invention there is provided a dry peelable coating system for applying to a substrate, the coating system comprising:
  a pre-manufactured laminate material constructed from a fabric layer having a pressure sensitive adhesive applied to the underside.

Preferably, a pre-manufactured laminate material has one or more applied upper coating layers.

According to an aspect of the invention there is provided a method of applying a dry peelable coating to a substrate, the method comprising the steps of:
  applying a pre-manufactured dry peelable coating system reinforcing layer atop the base layer.

Preferably the method includes the step of: applying a coating layer atop the reinforcing layer when in-situ.

According to an aspect of the invention there is provided a peelable coating comprising:
  a base layer releasablly peelablly applied atop a surface substrate;
  a reinforcement layer located atop the base layer; and
  a bond layer applied atop the reinforcement layer for bonding through the reinforcement layer to the base layer.

According to an aspect of the invention there is provided a method of applying a peelable coating comprising:
  applying a releasablly peelable base layer atop a surface substrate;
  locating a reinforcement layer atop the base layer; and
  applying a bond layer atop the reinforcement layer for bonding through the reinforcement layer to the base layer.

According to a further aspect of the invention there is provided a peelable coating comprising:
  a base layer releasablly peelablly applied atop the surface substrate;
  a bond layer applied atop the base layer;
  a reinforcement layer applied atop the bond layer;
  wherein the bond layer bonds the reinforcement layer to the base layer such that the peelable coating can be peelablly removed from atop the surface substrate.

According to a further aspect of the invention there is provided a second method of applying a peelable coating comprising:
  applying a releasablly peelable base layer atop a surface substrate;
  applying a bond layer atop the base layer;
  locating a reinforcement layer atop the base layer and bond layer such that the bond layer bonds the reinforcement layer to the base layer.

According to a further aspect of the invention there is provided a peelable coating comprising:
  a reinforcement layer applied atop applied atop the surface substrate;
  a base layer releasablly peelablly applied atop the surface substrate through the reinforcement layer.

Preferably, a bond layer is applied atop the base layer and reinforcement layer.

According to a further aspect of the invention there is provided a third method of applying a peelable coating comprising:
  applying a reinforcement layer atop a surface substrate; and
  applying releasablly peelable base layer atop the reinforcement layer, for forming a substantially continuous base layer beneath the reinforcement layer.

Preferably, the third method comprises the step of applying a bond layer over the base layer and reinforcement layer.

Preferably the base layer releasablly adheres to the surface substrate. More preferably, the bond layer bonds the reinforcement layer to the base layer with a stronger bond than between the base layer and surface substrate, such that the peelable coating is peelable from the surface substrate. Most preferably, the surface substrate is a flooring substrate.

Preferably the base layer is allowed to dry before the reinforcement layer is located atop the base layer.

The base layer preferably comprises any one or more selected from the set including: natural latex, pre-vulcanised natural latex, high solids styrene-butadiene latex.

The reinforcement layer preferably comprises any one or more selected from the set including: a fibreglass mesh or a bio-degradable composition mesh. More preferably, a bio-degradable composition mesh reinforcement layer includes 'jute' or 'hessian'. Most preferably, 'jute' or 'hessian' is treated with a resin that impregnates into the fibres.

The bond layer preferably comprises any one or more selected from the set including: pure acrylic, styrene acrylic, carboxylated styrene butadiene, polyurethane dispersions.

A base layer preferably comprise any one or more of the following: natural rubber latex (N.R.L.), pre-vulcanized natural rubber latex, and/or high solids styrene-butadiene rubber (S.B.R.).

Preferably, a bond layer can comprise 100% pre-vulcanized natural rubber latex. More preferably, a bond layer can comprises a blend of pre-vulcanized natural rubber latex and stabilized natural rubber latex. Most preferably, the blend includes 30% to 50% pre-vulcanized natural rubber latex. A bond layer is preferably adapted to provide improved sealing and further reinforcement of the base layer - reinforcement layer composite.

Preferably, a peelable coating is applied to a recently (or newly) poured concrete substrate. More preferably, a peelable coating improves the curing rate of the concrete—and thereby increases the compressive strength of the cured concrete.

According to an aspect of the invention there is provided a peelable coating for applying to a substrate, the peelable coating comprising:
  a base layer that can be peelable applied to the substrate; and
  a pre-manufactured reinforcing layer for applying atop the base layer.

According to an aspect of the invention there is provided a peelable coating for applying to a substrate, the peelable coating comprising:
  a pre-manufactured laminate material constructed from a fabric reinforcing layer having a pressure sensitive adhesive base layer applied to the underside of the fabric reinforcing layer;
  one or more coating layers are applied to the upper side of the fabric reinforcing layer; and
  wherein and an outer coating layer peelablly releasablly bonds to the pressure sensitive adhesive, thereby enabling the laminate material to be rolled for packaging and storage.

According to an aspect of the invention there is provided a method of applying a peelable coating to a substrate, the method comprising the step of: applying a base layer to a substrate, the base layer being peelablly applied to the substrate.

BRIEF DESCRIPTION OF THE DRAWINGS

A preferred embodiment of the invention will now be described, by way of example only, with reference to the accompanying drawings in which.

PREFERRED EMBODIMENT OF THE INVENTION

Figure 1:
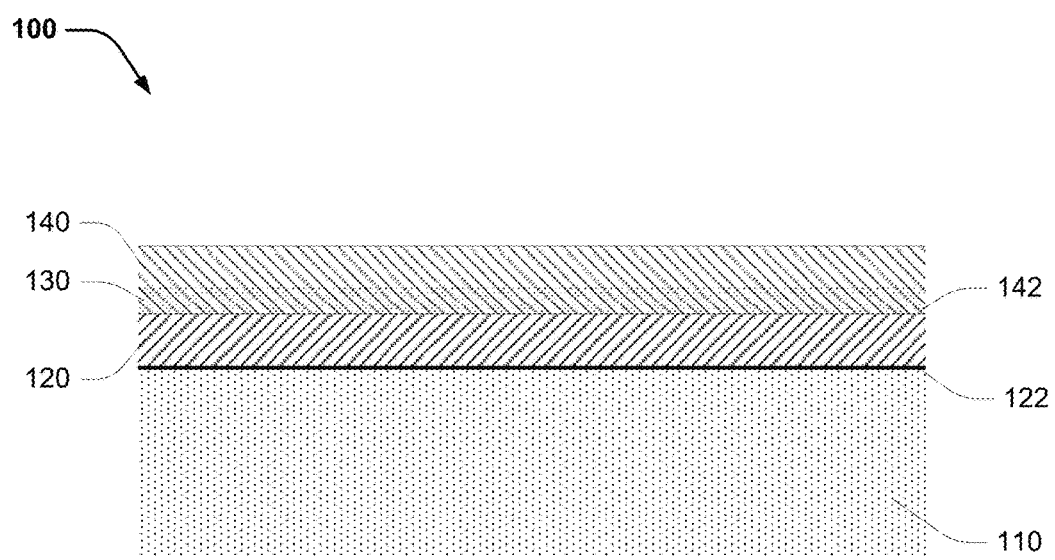
FIG. 1 is a sectional side view of a peelable coating according to the invention.

Referring initially to FIG. 1 of the drawings, in an example embodiment, a peelable coating 100 applied atop a surface substrate 110 comprises a base layer 120 that is releasablly peelablly applied atop a surface substrate, a reinforcement layer 130 located atop the base layer, and a bond layer 140 applied atop the reinforcement layer for bonding through the reinforcement layer to the base layer.

It will be appreciated that the surface substrate 110 is typically sealed prior to application of the peelable coating 100. The sealer will be appropriate to the material of the surface substrate. In some surface substrates, for example raw concrete or vinyl, no sealing may be required.

In this embodiment the base layer releasablly adheres to a surface substrate at 122 in the form of a flooring surface substrate. The bond layer bonds, along with the reinforcement layer 130, to the base layer at 142 with a stronger bond than between the base layer and surface substrate. This enables the peelable coating to be peeled from the surface substrate as required.

In an embodiment, by way of example only, the base layer 120 can selected from a set comprising: natural latex, pre-vulcanised natural latex, high solids styrene-butadiene latex. It will be appreciated that the base layer can further comprise a blend of two or more of these materials.

One or more additives may further be included in the base layer. These additives can, by way of example, include: stabilising surfactants (either non-ionic or anionic), thickeners (either non-associative or associative), antifoaming agents, biocides, antioxidants, fillers (such as $CaCO_3$), crumb rubber, microspheres, colour pigments, polyacrylate or polyphosphate dispersants.

In an embodiment, by way of example only, the reinforcement layer 130 is typically a mesh of either a fibreglass blend or a bio-degradable composition.

In an embodiment, by way of example only, the bond layer 140 can be selected from a set comprising: pure acrylic, styrene acrylic, carboxylated styrene butadiene, polyurethane dispersions. It will be appreciated that the bond layer can further comprise a blend of two or more of these materials.

One or more additives may further be included in the bond layer. These additives can, by way of example, include: silica sand, fillers (such as $CaCO_3$), microspheres, biocides, antifoaming agents, $TiO_2$, alumina trihydrate, polyacrylate dispersants, polyphosphate dispersants, thickeners (either non-associative or associative) or colour pigments.

Styrene-butadiene or styrene-butadiene-rubber (SBR) is a synthetic rubber copolymer consisting of styrene and butadiene, and has suitable abrasion resistance. Styrene-butadiene can also be blended with natural rubber. Styrene butadiene rubber latex is a kind of high-polymer dispersion emulsion aggregated by butadiene and styrene. Carboxylated styrene butadiene rubber latex is also a kind of high-polymer dispersion emulsion aggregated by butadiene and styrene. This product has good inter-miscibility to padding, large volume of filling, strong viscosity, little foam, and solid coating.

An aqueous polyurethane (PU) dispersion is a binary colloidal system in which the polyurethane particles are dispersed in a continuous aqueous medium. Polyurethane dispersion have an advantage that the viscosity of dispersion is typically independent of the molecular weight of the polymer. Therefore, the polyurethane dispersion can be prepared at relatively high solid content with the molecular weight high enough to form a deposited film with suitable performance through physical drying (even at ambient temperatures).

Figure 2:
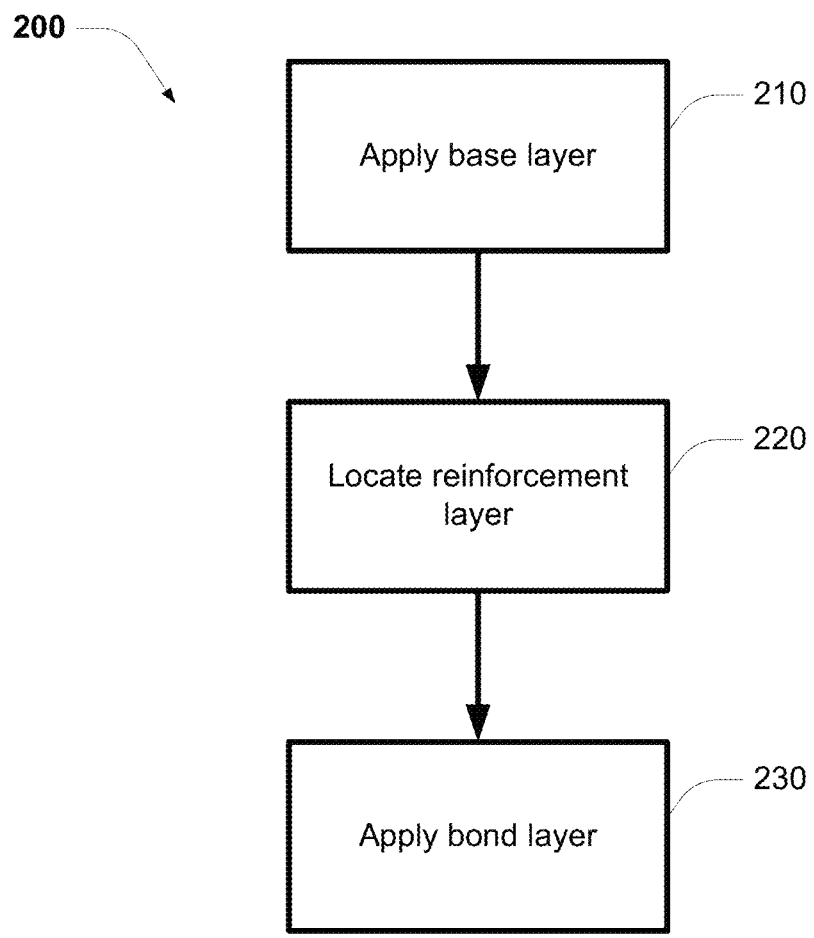
FIG. 2 is an example flowchart for a method of applying a peelable coating according to the invention.

FIG. 2 shows an example flowchart 200 for a method of applying a peelable coating as previously described. This method of applying a peelable coating comprises:

STEP 210, applying releasablly peelable base layer atop a surface substrate;

STEP 220, locating a reinforcement layer atop the base layer; and

STEP 230, applying bond layer atop the reinforcement layer for bonding the reinforcement layer to the base layer.

In an example embodiment, a peelable coating 100 is a water based two coat system that is reinforced with a fiberglass mesh. Alternatively, a bio-degradable composition mess can be used to reinforce the peelable coating. This coating provides a temporary peelable film for protecting a floor substrate from damage during a construction stage, and is suitable for both residential and commercial applications. The peelable coating can provide a non-slip impervious film when applied to the substrate, such that it does not slide and restricts foreign materials (including liquids) from coming into contact with the substrate. The peelable coating can withstand relatively heavy traffic, sunlight, rain or water, scuffing and is resistant to impact damage. It will be appreciated that the peelable coating, when applied to green concrete, can assist in curing concrete by retaining moisture.

Suitable substrates for receiving the peelable coating can include:
Concrete—sealed, polished or raw;
Tiles—granite, porcelain, marble etc.;
Sealed timber floors;
Stainless steel;
Painted steel;
Glass;
Fiberglass;
Bench Tops; and
Selected Linoleum products.

In an embodiment, applying the peelable coating to a substrate can include the steps of:

a) ensuring the substrate is sealed, dry, clean and free of contaminates;

b) taping the perimeter of area to be coated with a UV stable adhesive tape;

c) applying a base layer (or coat) with either a brush, roller or airless spray gun, and finishing over half of the perimeter tape;

d) allowing the base layer to dry sufficiently;

e) laying out (or locating) fiberglass mesh (or bio-degradable mesh) onto the base layer, finishing up to the border tape, and ensuring that each run of mesh is over lapping the last run;

f) applying a bond layer with a brush or roller, and finishing over half of the border tape without coming into contact with the substrate, such that the bond layer is sufficiently thick to ensure it embeds into the mesh in an even coat;

g) allowing the bond layer to dry for a minimum of 12-24 hours prior to receiving traffic.

In this example embodiment, the base layer material is a hybrid blend of both pre-vulcanized natural rubber latex and an styrene-butadiene-rubber copolymer latex. This material has approximately 65-75% solids, a pH level of between 9.0-10.5, a viscosity between 6,000-8,000 mpa·s. This material is water based and non-hazardous. In an alternative embodiment, the base layer may comprise a single material.

In this example, the reinforcement mesh layer is either a fiberglass blend or a bio-degradable composition, having a weight of approximately 145-160 gsm, and a square size of about 5 mm-6.5 mm.

In this example, the base layer material is a blend of waterborne acrylic/styrenated acrylics and carboxylated styrene/butadiene copolymers. This material has approximately 55-65% solids, a pH level between 7.8-8.5, a viscosity between 4,000 mpa·s -5,500 mpa·s. This material is also water based and non-hazardous. It will be appreciated that the viscosity of the base layer material can include a greater range from 5 mpa·s through 8000 mpa·s.

In an embodiment, by way of example only, a peelable coating can include:

Silica sand applied to the top coat (or bond layer) to provide anti-slip surface;

Biocides as an in-can preservation, to provide mould and fungi resistance to the coating;

$TiO_2$ in the top coat (or bond layer) to provide protection from UV radiation and free radical attack; and Thickeners to provide rheology control for application and coating thickness.

In this embodiment, a peelable coating can optionally include any one or more of the following:

$CaCO_3$ and/or Microspheres as an extender, for providing a cost reduction, increased solids content, faster drying rates and a higher film build;

Dispersants to aids filler dispersion by imparting an electrical charge to the filler particles' surface;

Alumina tri hydrate to impart ignition resistance for the coating; and

Colour pigments to visual aid application of the layers.

Silica sand can be added to the bond layer to provide an anti-slip surface on the peelable coating.

Thickeners can be used to provide rheology control over film/coating thickness and for aiding in application.

$CaCO_3$ and microspheres are typically used as an extender for any one or more of the following:
reducing cost of the peelable coating;
increasing solids content;
providing faster drying rates; and
building a higher film/coating.

If fillers (for example $CaCO_3$ and microspheres) are used, dispersants are typically added to aid filler dispersion by imparting an electrical charge to the particle's surface.

Biocides are provided for in-can preservation and protecting a dry film/coating from mould and fungi.

TiO$_2$ provides protection from UV radiation and free radical attack, which is typically applied to the bond layer (or top coat).

Alumina tri hydrate can be added to either of the layers for providing ignition resistance, if required.

Colour pigments may be added to either of the layers for providing a visual aid during application.

Figure 3:
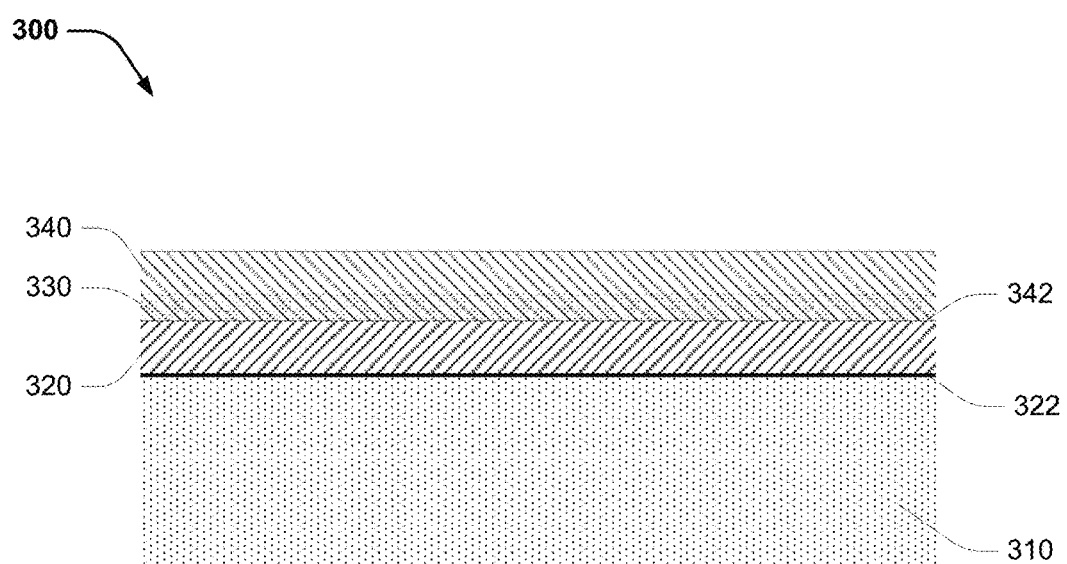
FIG. 3 is a sectional side view of a peelable coating according to the invention.

Referring to FIG. 3, in an example embodiment, a peelable coating 300 applied atop a surface substrate 310 can comprise:
- a base layer 320 releasablly peelablly applied atop the surface substrate;
- a bond layer 340 applied atop the base layer;
- a reinforcement layer 330 applied atop the bond layer;
- wherein the bond layer bonds the reinforcement layer to the base layer such that the peelable coating can be peelablly removed from atop a surface substrate.

The base layer and reinforcement layer are sufficiently bonded together to enable the peelable coating to be peelablly removed from atop a surface substrate, without leaving substantial residue. In this embodiment, the base layer releasablly adheres to a surface substrate at 322 in the form of a flooring surface substrate. The bond layer 340 bonds the base layer 320 to the reinforcement layer 330 at 342 with a stronger bond than between the base layer and surface substrate. This enables the peelable coating to be peeled from the surface substrate as and when required.

It will be appreciated that the surface substrate 310 can be sealed prior to application of the peelable coating 300. The sealer will be appropriate to the material of the surface substrate. In some surface substrates, for example raw concrete or vinyl, no sealing may be required.

Figure 4:
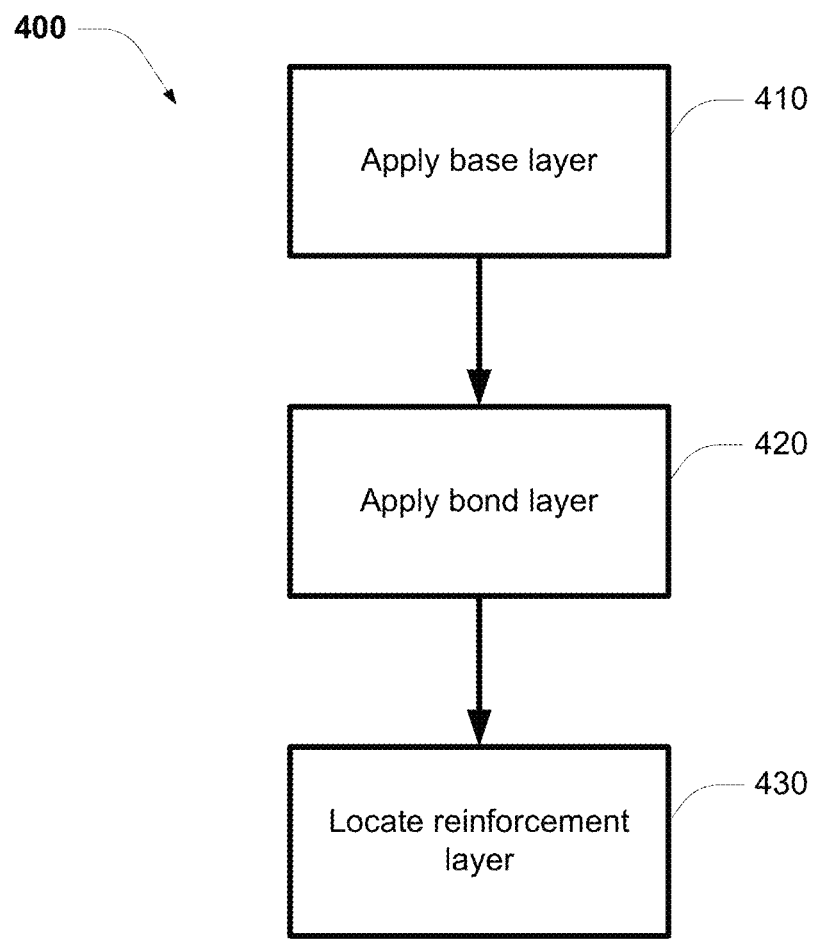
FIG. 4 is an example flowchart for a method of applying a peelable coating according to the invention.

FIG. 4 shows an example flowchart 400 for a method of applying a peelable coating as previously described. This method of applying a peelable coating comprises:
- STEP 410, applying releasablly peelable base layer atop a surface substrate;
- STEP 420, applying a bond layer atop the base layer;
- STEP 430, locating a reinforcement layer atop the base layer and bond layer for bonding the reinforcement layer to the base layer.

It will be appreciated that the disclosed peelable coating can provide a floor and wall protection system, which can offer improvements to design, purpose and application of coating systems. Additionally, it will be appreciated that the disclosed coating can provide advantages within the concrete curing industry, with potential flow on benefits to the consumer.

Applying a peelable coating to assist curing of concrete can enable improved retention of moisture within the concrete, thereby allowing the concrete to cure in a substantially preferred manner. The peelable coating can further act as a thermal-insulating coating. The peelable coating can further act to protect the substrate surface from damage, dirt, and staining during a construction phase.

It will be appreciated that a peelable coating, by way of example, is a liquid laminated floor coating (or protection) system that provides a continuous homogenous film coating that peelablly removably binds itself to the floor substrate. By reducing moisture and thermal losses from the concrete, an increased compressive strength and reduced tendency for cracking can be achieved, when compared to traditional 'air-dried' concrete. Curing rates can improved, when compared to traditional 'air-dried' concrete.

An embodiment peelable coating can provide a substrate with anti-slip properties and an improved fire rating. Removal of the peelable coating can be effected without altering the integrity of the substrate surface or leaving a residue, thereby resulting in a substrate that is cured and/or clean.

In an embodiment, a reinforcement layer can include a natural fibre mesh/matting, which can provide a 'green and biodegradable' alternative to existing coating systems. A natural fibre known as 'jute' or 'hessian' can be treated with a resin that impregnates into the fibres. This treatment can facilitate the final peelable coating product having a relatively high biodegradability and land fill rating. Further, by treating a natural fibre reinforcement layer with a resin, a floor coating system can achieve: an improved impact resistance, increased durability, an improved lamination between the reinforcement layer and base layer, and an improved uniform removal of the coating system.

Composition of an embodiment impregnating resin can include:
- A binder agent, for example Ethylene Acrylic Acid (EAA) polymer at 80-90 parts dry, typically the Ethylene Acrylic Acid comprising 5% to 20% Acrylic acid in the molecule;
- A foaming agent, for example Alkyl Dimethyl Amine Oxide ("Cocamine Oxide") 1-3 parts;
- A water and oil resistance agent, for example Fluoro Chemical Resin 0.5-2 parts.

An embodiment natural fibre reinforcement layer can include jute or hessian (for example having a weight of 5oz-9 oz per sq yard. In preparing the natural fibre reinforcement layer, an impregnating resin composition is applied. For example, an aqueous dispersion impregnating resin composition is applied at concentrations from 10%-45% and foamed to a density from 30 g/L to 200 g/L—depending on desired "add-on level". The impregnated reinforcement layer is then typically dried at a temperature above 80 degrees Celsius to enable complete film formation of the polymer resin and to remove substantially all water from the reinforcement layer. This treatment can: reinforce the natural fibre, impart water and oil repellent properties, improve wear resistance, and assist application (or laying) of the reinforcement layer.

An embodiment bond layer can accommodate a natural fibre reinforcement layer. The bond layer can be applied atop a base layer, acting as an adhesive for a natural fibre reinforcement layer—similar in function to a contact adhesive. The natural fibre reinforcement layer is applied atop the bond layer, and rolled onto the wet bond layer, imbedding bonding the reinforcement layer within the bond layer, and bonding the reinforcement layer to the base layer—such that the peelable coating can be peelablly removed from atop a surface substrate. The composition of the bond layer can comprise a relatively viscous (10,000 mPa·s-15,000 mPa·s) sticky coating. An anti slip aggregate is typically not added to this bond layer. The adhesion properties of the bond layer are sufficient to provide additional bonding between the base layer and a fibrous natural fibre reinforcement layer.

An embodiment bond layer can include a blend of two or more materials. An example bond layer can include any one or more of the following:
- pre-vulcanized rubber latex (N.R.L.) of 20%-40% by dry solids weight;
- a styrene acrylic polymer at 40%-60% by dry solids weight;
- a carboxylated styrene butadiene polymer blend 20%-30% by weight of solids;
- pre-vulcanized natural rubber latex of 100%; and blends pre-vulcanized natural rubber latex with stabilized natural rubber latex, typically comprising 30% to 50% pre-vulcanized natural rubber latex.

Microspheres or glass spheres can also been added as a lightweight filler to create bulk/mass and lower specific gravity. This can replace a fine sand filler typically used for slip resistance.

The base coat can be adapted to accommodate 'aggressive' substrates including raw and/or coarse concrete surfaces. By providing a higher viscosity base coat, with a different filler composition, a corresponding applied peelable coating may be more easily removed from raw concrete surfaces, and/or sealed concrete surfaces and/or aggressive course 'broomed' concrete surfaces. A filler composition can include a higher filler loadings of $CaCO_3$ type filler from 50-200 parts per 100 dry polymer. Typically, filler loadings of $CaCO_3$ type filler is from 100-150 parts per 100 dry polymer.

Figure 5:
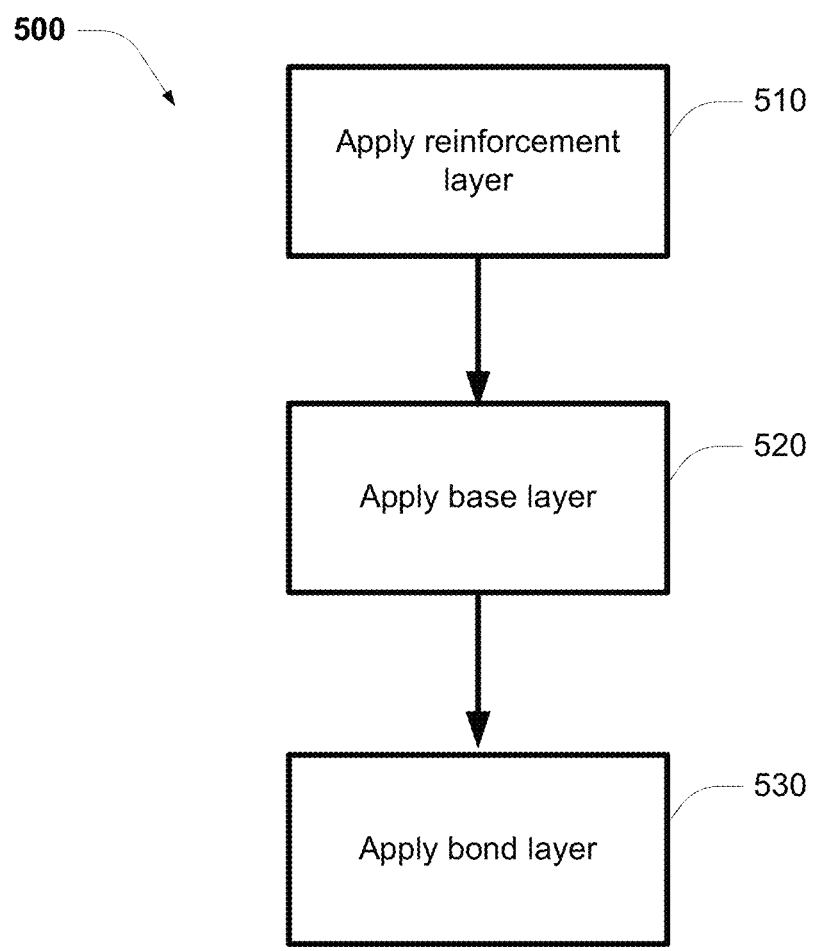
FIG. 5 is an example flowchart for a method of applying a peelable coating according to the invention.

FIG. 5 shows an example flowchart 500 for a method of applying a peelable coating as previously described. This method of applying a peelable coating comprises:
- STEP 510, applying a reinforcement layer atop a surface substrate;
- STEP 520, applying releasablly peelable base layer atop the reinforcement layer, for forming a substantially continuous base layer beneath the reinforcement layer.

In this example method, a bond layer can be applied (STEP 530) over the base layer and reinforcement layer.

By way of example, a base layer can comprise any one or more of the following: natural rubber latex (N.R.L.), pre-vulcanized natural rubber latex, and/or high solids styrene-butadiene rubber (S.B.R.).

By way of example, a bond layer can be adapted to provide improved sealing and further reinforcement of the base layer—reinforcement layer composite. A bond layer can comprise 100% pre-vulcanized natural rubber latex or/and blends with stabilized natural rubber latex. Typically, a blend comprises 30% to 50% pre-vulcanized natural rubber latex.

It will be appreciated that an embodiment peelable coating can provide one or more of the following advantages:
- a homogeneous coating that adhering to a concrete surface;
- a homogeneous coating that adheres across a plurality of substrate surfaces;
- uniform slip resistance across a plurality of substrate surfaces;
- an substantially uniform seal over a concrete surface, for retaining moisture and assisting non-prematurely curing of the concrete;
- retains moisture within a concrete substrate, thereby increasing compressive strength when cured;
- a thermal-insulating coating for improving a concrete curing process;
- a water resistant coating that can substantially protects the concrete from staining;
- a ultra violet resistant coating that can substantially protects the concrete from staining;
- protects a concrete substrate or surface, which when removed does not: leave any substantially residue on the concrete substrate of surface, or contaminate the concrete substrate or surface; or affecting integrity of the concrete substrate of surface;
- a relatively easily removed peeling coating;
- an anti-slip coating;
- a fire resistance coating; and
- a surface for signage to be printed.

By applying the peelable coating to a recently (or newly) poured concrete substrate, a improved curing rate can be achieved—thereby increase the compressive strength of the cured concrete. This may further provide cost benefits by reducing the size requirement of the concrete, or allow for the specification of a lesser strength concrete. Further this peelable coating can be used in protecting polished concrete once poured.

The peelable coating adheres to the surface, but typically does not leave a residue when removed. Other curing agents are known to have limitations of either effecting the surface of the concrete and/or leaving a residue.

It will be appreciated that a base layer in the form of a modified latex compound typically has limited UV protection and is not adequately protected against abrasion. A reinforcement layer, possibly in combination with a bond layer, can typically provide abrasion protection, UV protection and slip resistance.

Figure 6:
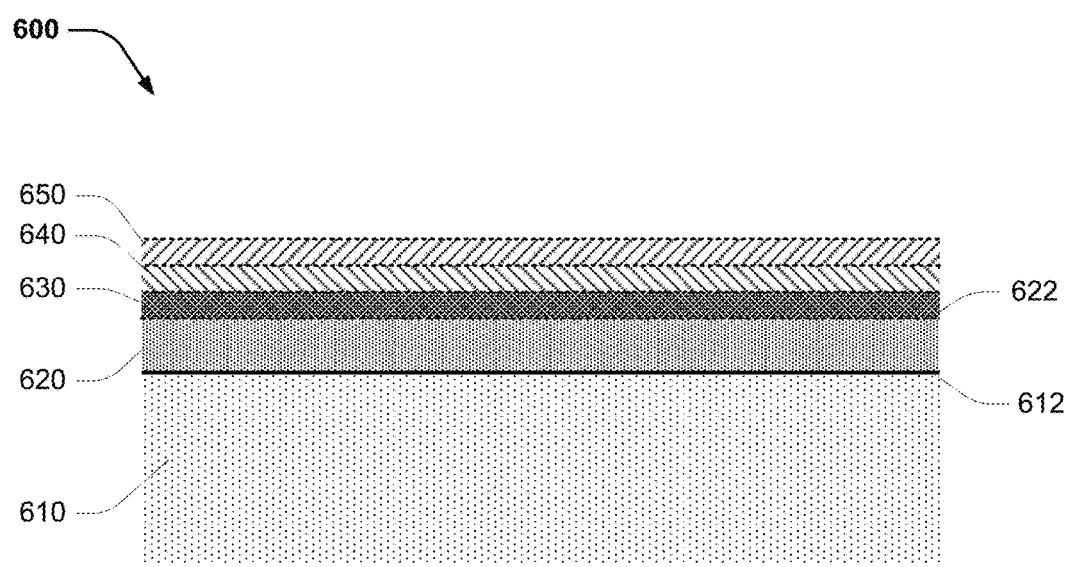
FIG. 6 is a sectional side view of a peelable coating according to the invention.

FIG. 6 shows an alternative embodiment peelable coating system 600 for applying to a substrate 610. This peelable coating system 600 can comprise a liquid applied base layer 620 (or wet base coat system) having a peelable property when dry, and a pre-manufactured reinforcing layer 630 can have applied various coating 640, 650.

A wet base layer 620 is first applied to the substrate surface 612, and the fabric 630 is then applied on the wet base layer surface 622.

In an embodiment, by way of example only, a wet base layer 620 is in the form of a water based product, comprising of a modified pre-vulcanized natural rubber latex and a stabilized natural rubber latex. The water based product is formulated by way of additives including, stabilizing surfactants, thickeners, antifoaming agents, biocides, antioxidants, fillers, dispersants and white pigments.

In an embodiment, by way of example only, a single reinforced layer 630 is in the form of fabric including any one or more of the following: a non woven polyester spun bond material, a polyester material, polypropylene material, jute material, burlap material or hessian material, woven cotton material. It will be appreciated that some fabrics are biodegradable for reducing landfill rubbish. The typical weight of the non woven fabrics are from 120 gsm to 400 gsm. The typical weight used for jute, hessian and burlap is from 7 oz-9 oz. In an embodiment one or more reinforced layers may be used.

A single reinforced layer fabric can have applied a coating layer 640. A selection of various formulated coatings can be applied to the fabric by way of a fabric coating line and or similar machinery to that used in the carpet industry. However, in some cases the selected fabric can be supplied in an un-coated (or raw) form.

The optional coating layer 640 can provide the fabric reinforced layer 630 with a protective film. Application of a coating layer 640 creates the second component in a dual layer laminated system. The pre-laminated system comprising a fabric reinforced layer 630 and a coating layer 640 can offer a pre-manufactured material that has advantages, including: speed of installation, relative ease of in-situ installation, quality control, and substantially immediate access to a working surface.

It will be appreciated that the protection qualities can vary depending on the fabric selected for the reinforced layer 630 and a coating selected for the coating layer 640. These properties can include any one or more of the following:
- suitability for internal use;
- suitability for external use;
- fire resistance;

smoke value;
slip resistance;
mould resistance;
fungus resistance;
weather resistance;
ware resistance resulting from traffic demands; and
bio-degradability.

In an embodiment, by way of example only, a pre-manufactured reinforcing layer 630 is provided in a 'raw' or 'uncoated' form. This can provide a budget, (or lower performance) product that is typically for domestic and/or short term use. This pre-manufactured reinforcing layer 630 can be printed, rolled and marketed and/or provided as a peelable coating system kit including a base coat in correct proportions for forming a wet base layer 620.

In an embodiment, by way of example only, a pre-manufactured reinforcing layer 630 is provided with an applied formulated top coat or coating layer 640. Composition of a coating layer (coating compound) can include:
- binder comprising any of one or more of the following: water borne Acrylics, Styrene/Butadiene, Polyvinyl chloride, Vinyl Acetate, NR Latex, Prevulcanised Latex, or blends and copolymers of these Latexes; and/or
- filler comprising any of one or more of the following: calcium carbonate, alumina tri-hydrate, silica, microspheres; and/or
- foaming agent in the form of Sodium Lauryl Sulphate or Ammonium Lauryl Sulphate or any surfactant exhibiting foam boosting properties.

It will be further appreciated that filler can be used as extenders or to impart fouling-release (FR) characteristics. It will be further appreciated that compound rheology is modified by adding thickeners such as Polyacrylates, Cellulosic types or Clay mineral base elements.

An embodiment method of applying a coating layer 640 to a reinforcing layer 630 on that coating line can include: running the coating compound across a continuous foaming machine, applying the coating compound to the fabric at densities from about 200 g/l to 800 g/l by means of a blade or roller. In some instances the compound may also be applied unfoamed. Drying typically occurs in ovens used on stentered fabric coating lines.

This pre-manufactured reinforcing layer 630 can be printed, rolled and marketed and/or provided as a peelable coating system kit including a base coat in correct proportions for forming a wet base layer 620.

In an embodiment, by way of example only, a pre-manufactured reinforcing layer 630 is provided with an applied formulated top coat or coating layer 640. Composition of a coating layer (coating compound) can further include:
- binder comprising comprising any of one or more of the following: water borne Poly Acrylates, Styrene/Butadiene, PVC, Vinyl Acetate, NR Latex, Prevulcanised Latex, and Bitumen.
- filler for imparting anti-slip properties, comprising any of one or more of the following: paraffin waxes, microspheres, fine sand.

It will be further appreciated that fouling-release (FR) characteristics can be enhanced with Alumina tri-hydrate type fillers. The coating composition adapted to yield high abrasion and water resistance, while maintaining flexibility over a wide temperature range for ease of handling and installation.

An embodiment method of applying a coating layer 640 to a reinforcing layer 630 on that coating line can include: running the coating compound across a continuous foaming machine, applying the coating compound to the fabric at densities from about 200 g/l to 800 g/l by means of a blade or roller. In some instances the compound may also be applied unfoamed. Drying typically occurs in ovens used on stentered fabric coating lines.

This pre-manufactured reinforcing layer 630 can be printed, rolled and marketed and/or provided as a peelable coating system kit including a base coat in correct proportions for forming a wet base layer 620.

In an embodiment, by way of example only, a pre-manufactured reinforcing layer 630 is provided with an applied formulated top coat or coating layer 640. This reinforcing layer 630 can include heavier weight material such as non woven fabrics PES or PP at 200-400 gsm weight, and/or biodegradable materials such as hessian, jute, burlap at 9 oz or greater weight.

In some embodiments this reinforcing layer 630 can be supplied in a raw or an untreated form. Alternatively, a reinforcing layer 630 (typically when comprising jute, hessian, burlap) can be coated on a backing/coating line with a first coating layer 640.

Composition of this first coating layer 640 (coating compound) can further include:
- binder comprising any of one or more of the following: prevulcanised NR-Latex, NR-Latex, Styrene/Butadiene Latex or blends of these.
- filler comprising any of one or more of the following: Calcium carbonate, Alumina tri-hydrate, Silica fillers or blends in various ratios.
- foaming agents foaming agent in the form of Potassium oleate, Sodium Lauryl sulphate or Ammonium Lauryl sulphate.
- Thickener in the form of poly acrylates or modified cellulose ethers.

An embodiment method of applying a coating layer 640 to a reinforcing layer 630 on that coating line can include: running the coating compound across a continuous foaming machine, applying the coating compound to the fabric at densities from about 200 g/l to 800 g/l by means of a blade or roller. In some instances the compound may also be applied unfoamed. Drying typically occurs in ovens used on stentered fabric coating lines.

In an example embodiment, a second coating layer 650 may be applied for creating film that achieve any one or more the following: a more robust, water resistant, slip resistant, fire resistant, bacteria resistant. This second coating layer 650 may be pre-applied. Applying this second coating layer 650 can be achieved in a manner similar to that used in applying a first a coating layer 640.

Alternatively, a second coating layer 650 may be applied in-situ during installation enable a relatively even coverage, in-situ application is typically achieved by spraying with an airless gun (for example using a 431 or 533 spray tip), or applied with a paint roller. It will be appreciated that, the joins or laps can be coated to create a relatively uniformly coated surface.

Composition of this second coating layer 650 (coating compound) can further include:
- binder comprising any of one or more of the following: Prevulcanised NR-Latex, NR-Latex, Acrylic, Styrene/Butadiene;
- filler comprising any of one or more of the following: Calcium carbonate, Alumina tri-hydrate or Silica;
- thickening agent: Poly Acrylates.

It will be appreciated that Organic UV absorbers, (for example TiO2 or Carbon black) may be included to protect the polymers in outdoor situations, and to reduce aging and degradation.

This pre-manufactured reinforcing layer 630 can be printed, rolled and marketed and/or provided as a peelable coating system kit including a base coat in correct proportions for forming a wet base layer 620.

Figure 7:
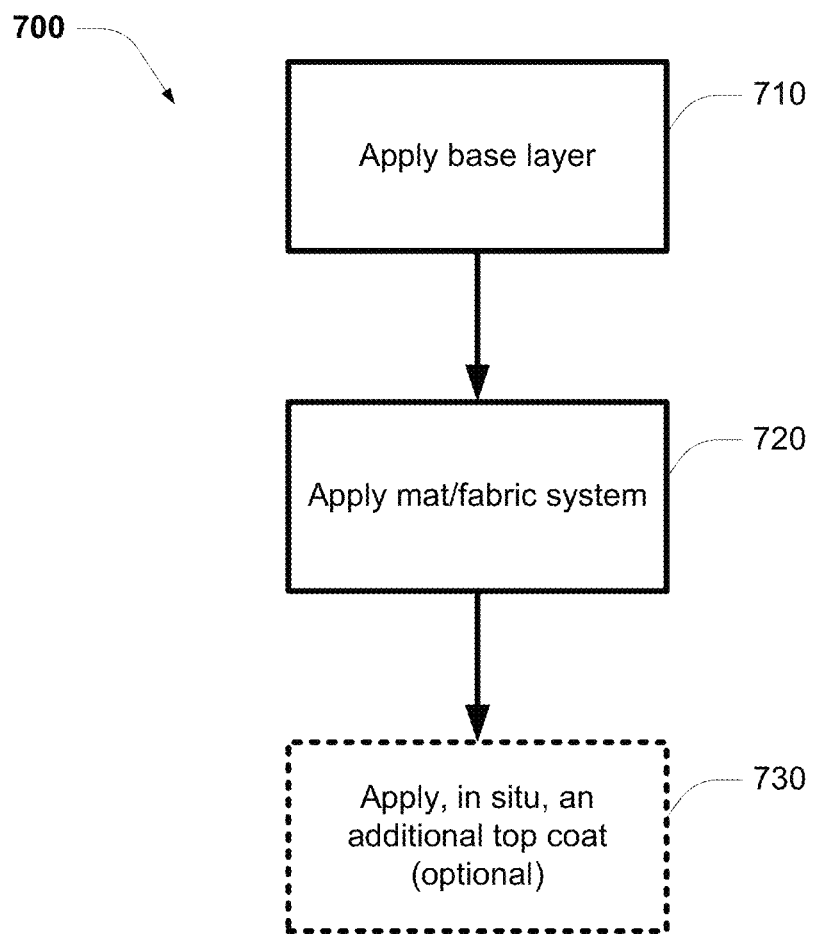
FIG. 7 is an example flowchart for a method of applying a peelable coating according to the invention.

Referring to FIG. 7, a method 700 of applying a peelable coating system (600 as shown in FIG. 6) to a substrate (610 as shown in FIG. 6). This method of application can comprise the steps of:

STEP 710: applying a liquid applied base layer (or wet base coat system) to the substrate, the base layer having a peelable property when dry;

STEP 720: applying a pre-manufactured reinforcing layer atop the base layer while wet;

STEP 730: applying (optional) a coating layer atop the reinforcing layer when in-situ.

It will be appreciated that the pre-manufactured reinforcing layer can have one or more applied coatings. The final coating may be applied in-situ.

Figure 8A:
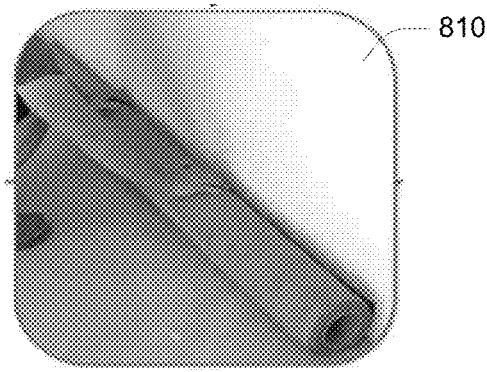
FIG. 8A through FIG. 8O are schematic views of method steps of applying a peelable coating according to the invention.
Figure 8B:
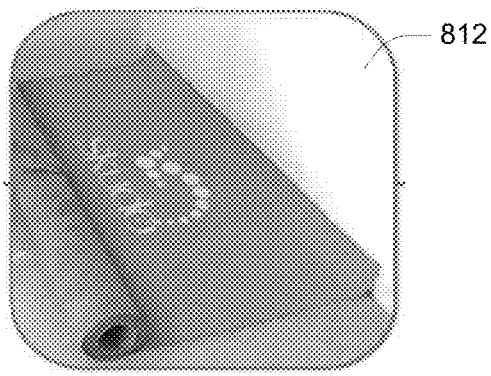
Figure 8C:
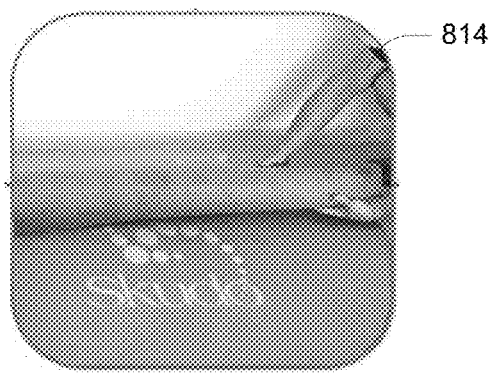
Figure 8D:
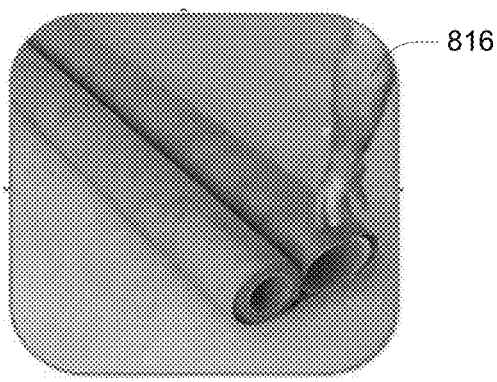
Figure 8E:
Figure 8F:
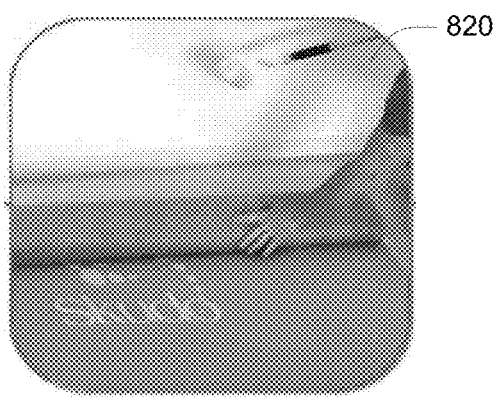
Figure 8G:
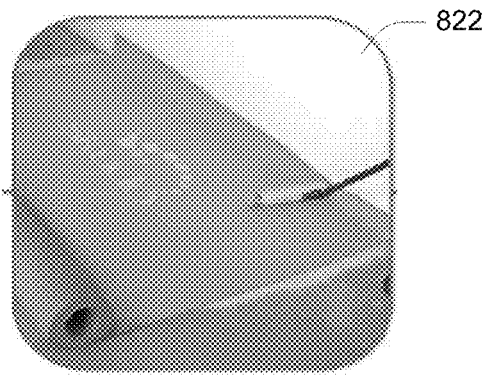
Figure 8H:
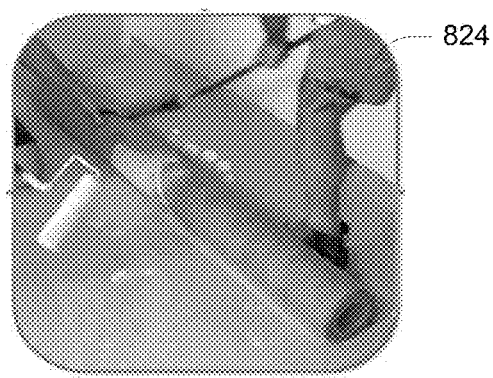
Figure 8I:
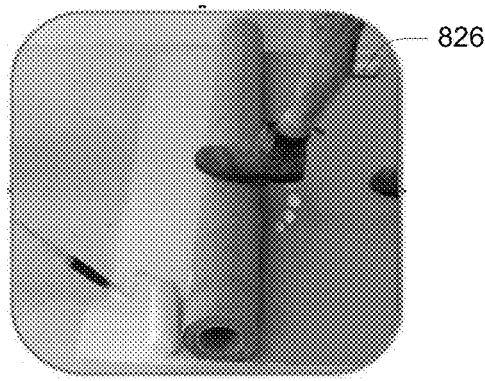
Figure 8J:
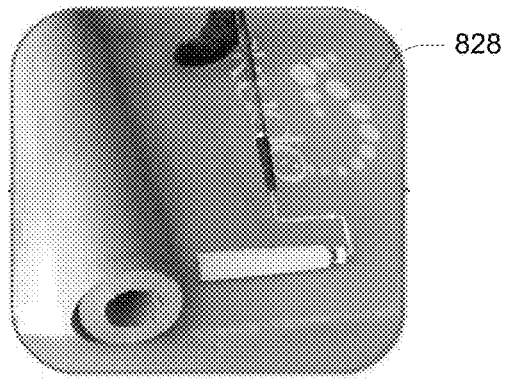
Figure 8K:
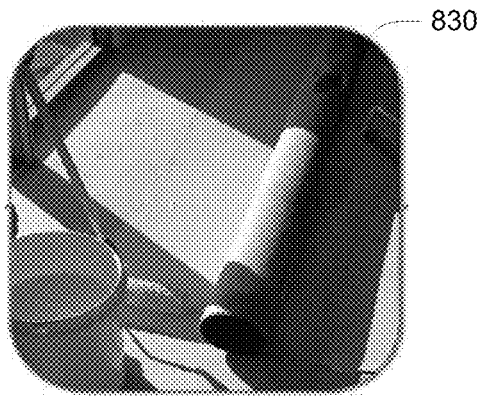
Figure 8L:
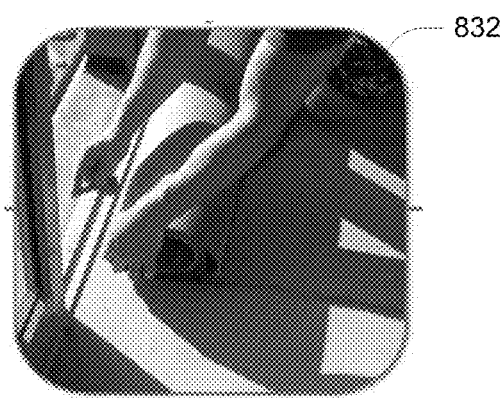
Figure 8M:
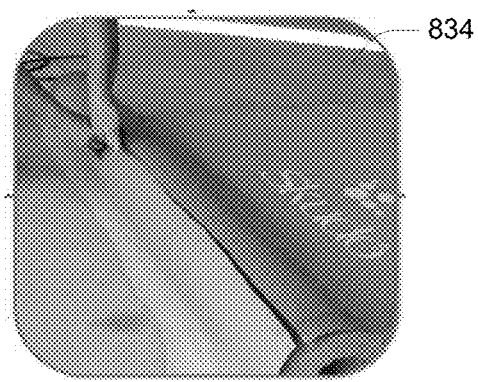
Figure 8N:
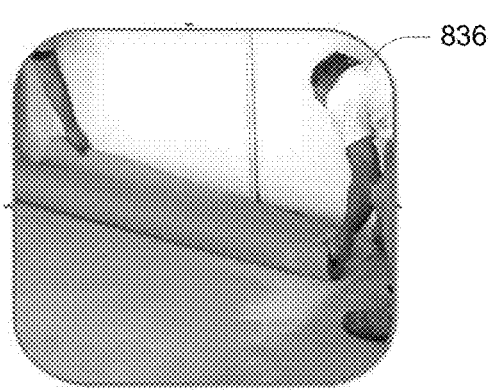
Figure 8O:
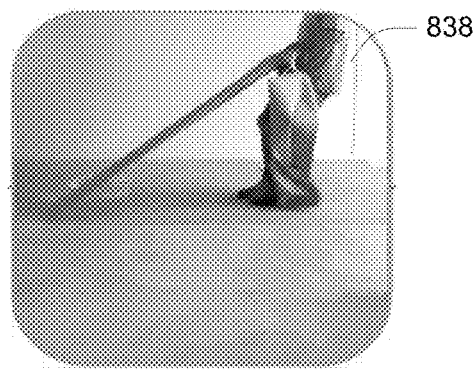

FIG. 8A through FIG. 8O show a method, by way of example only, of applying a peelable coating system (600 as shown in FIG. 6) to a substrate (610 as shown in FIG. 6).

Preparation is very important to ensure high performance of the system. Check substrate suitability can be achieved by applying a small test patch of a wet base coat to an off-cut or sample piece of the substrate. After the base coat dries, peel and observe if the product has difficulty peeling or leaves any markings.

The area to be coated should be cleaned from dirt, dust, grime, oil, and other contaminants.

It is recommended that at least 6 hours of clear weather be forecast such that the base coat may dry adequately. It is beneficial for the area to be cordoned off for about 3 hours to allow for the base coat to dry adequately without substantial risk of premature damage. Adequate ventilation should be is maintained throughout the application. Application of the system should be undertaken between 5 and 27 degrees C.

If covering any products previously applied to the substrate (such as sealers, epoxies, painted, primed, or fiberglass products) all instructions relating to these products and their curing times should be adhered to.

This method of application can comprise the steps of:

STEP 810: Starting in the back corner of the assigned area and working towards the exit, place the pre-manufactured reinforcing layer roll against the wall allowing for a small overlay up the wall approximately 50-60 mm;

STEP 812: Then roll out approximately 1 metre of the pre-manufactured reinforcing layer, allowing it to be used as a parallel guide from the wall;

STEP 814: without moving the pre-manufactured reinforcing layer roll, lift up rolled out section;

STEP 816: without moving the pre-manufactured reinforcing layer roll, roll back the rolled out section allowing application of the base coat;

STEP 818: applying the wet base coat directly onto the substrate in a thick, consistent coat by way of roller or spray at the appropriate width of the pre-manufactured reinforcing layer roll and approximately 1 metre from the wall;

STEP 820: applying/laying the rolled out reinforcing layer mat onto the wet base coat;

STEP 822: pressing the reinforcing layer mat into the wet base coat to ensuring the two products are fused together, wherein 'pressing' can be achieved by using a dry roller;

STEP 824: once the reinforcing layer mat has been pressed into the wet base coat, roll back mat roll until a small amount of the existing base coat is exposed.

STEP 826: best practice utilising two workers—a first worker applying the base coat at the width of the mat;

STEP 828: best practice utilising two workers - a second worker pressing the mat directly following;

STEP 830: continue this process until the end of the assigned application area is reached;

STEP 832: cutting the mat roll using blade or scissors, and place the cut mat as per STEP 810;

STEP 834: ensuring that there is an overlap of approximately 50-60 mm between the two rolls;

STEP 836: repeating steps 810 through 834 until the assigned area is complete;

STEP 838: when ready to peel the system from the substrate, tearing it into strips.

In an example embodiment "high traffic" peelable coating system, can have the following properties.

| Base Coat | |
| --- | --- |
| Product type | Temporary peelable coating |
| Product use | Temporary protection during construction |
| Appearance | Off white liquid |
| Basic ingredients | Modified cis 1,4 poly isoprene, water, ammonia, calcium carbonate, titanium dioxide |
| Boiling point | 100 degrees C. (approx) |
| Odor | Very faint ammonia |
| Specific gravity | 0.96 |
| Vapor pressure | As for water |
| Solubility in water | Soluble in all proportions |

| Pre-coated Mat | |
| --- | --- |
| Product type | Temporary protective mat |
| Product use | Temporary protection during construction |
| Appearance | Fibrous mat with a coating on one face |
| Basic ingredients | Polyester fibres, styrene acrylic copolymer, carboxylated styrene, butadiene copolymer, titanium dioxide, styrene, ammonia aqueous |
| Grab strength | 750N |
| Weight | 500 gsm (approx) |
| Thickness | 3.5 mm (approx] |

| "high traffic" peelable coating system | | |
| --- | --- | --- |
| Fire Test | CHF | Mean 9.6 kw sqm |
| | Smoke Value | Mean 12% min |
| Bacteria Test | Fungal growth | No growth |
| Slip test | Wet slip resistance | Main 60 classification V |
| | Dry slip resistance | Mean 0.85 classification F |
| Concrete curing test | Water retention efficiency | Mean 91% |
| Concrete mpa test | Compressive strength | Increase of 8 mpa after 28 days |
| Exposure test | UV exposure and durability | 160,000 Langleys-pass |

Figure 9:
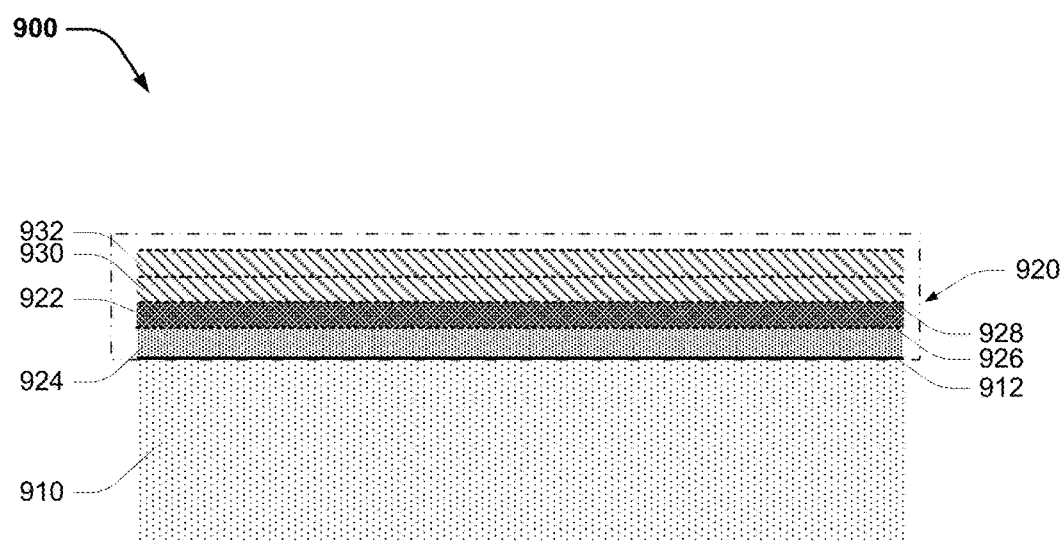
FIG. 9 is a sectional side view of a peelable coating according to the invention.

FIG. 9 shows an alternative embodiment peelable coating system 900 for applying to a substrate 910 as a 'dry' system without a liquid base layer. This peelable coating system 900 can comprise a pre-manufactured laminate material 920 constructed from a fabric layer 922 having a pressure sensitive adhesive 924 applied to the underside 926. The fabric layer 922 can have applied one or more coating layers (for example 930, 932) to an upper side 928. The peelable coating system 900 can be pre-manufactured for direct application to the substrate surface 912. Typically, and outer coating (for example 932) is applied such that the pressure sensitive adhesive 924 does not bond to the outer coating, enabling the laminate material to be rolled for packaging and storage.

It will be appreciated that a dry system material (or fabric) 920 can be pre-manufactured with top coat variants described herein. The dry system material (or fabric) 920 further includes a pressure sensitive adhesive formulation applied on a coating line to the underside of the fabric. This pressure sensitive adhesive can act as a replacement of a wet base coat.

It will be appreciated that the same reinforcing fabrics disclosed herein can be used in dry peelable coating system 900. It will be further appreciated that the same top coat layer/layers disclosed herein can be used in dry peelable coating system 900. The dry peelable coating system 900 replaces the use of a wet peelable adhesive (for example, base coat) with a pre-installed adhesive layer (for example, a pressure sensitive adhesive). This variation is the use of a different peelable method by way of a dry, sticky, pressure sensitive adhesive system. This therefore creates an alternative peelable coating to the same pre manufactured mat.

A formulated pressure adhesive layer can be applied as an additional coating on the coating/backing line. This formulated coating and application process is typically a pressure sensitive Acrylic polymer applied to the underside of the fabric unfoamed or foamed on a coating line as described herein. The pressure sensitive adhesive (PSA) is designed to adhere to the flooring substrate to keep the mat in place, but not to leave any significant residue upon peeling, while allowing a relatively easy removal of the mat.

It will be appreciated that a dry system material (or fabric) 920 can be pre-manufactured with top coat variants described herein. A top coat can be applied on coating/backing line acting as a protective top coat and as well as to assist in the finished mats being able to be rolled up without the use of a release paper—thereby not letting the pressure sensitive adhesive to adhere to the fabric. The composition of this coating and application method is typically filled or non-filled Ethylene Acrylic Acid (EAA) type polymers applied on coating lines as described herein. These olefinic polymers offer high water resistance coupled with "non stick" properties to allow roll up of the finished product.

The substrates to be protected may include any one or more of the following: polished sealed timber, ceramic and porcelain tiles, sealed stone, cabinetry, bench tops, vertical panels, baths, stair cases, Linolium, fiberglass, glass, primed metals and most non porous internal surfaces.

The dry peelable coating system 900 has advantages, including: speed of installation, relative ease of in-situ installation, quality control, and substantially immediate access to a working surface. This dry/pressing adhesion system would be beneficial to smooth, internal substrates including any one or more of the following: vertical panels, walls, bench tops, cabinets, baths, stair cases.

This dry peelable adhesive system can provide benefits over the wet base coat system by way of, for example, application speed, vertical uses, and being better suited for DIY and less skilled workers. Limitations are generally in reference to the surface or substrate type typically needing to be smooth and non porous, and of an indoor type use.

Figure 10:
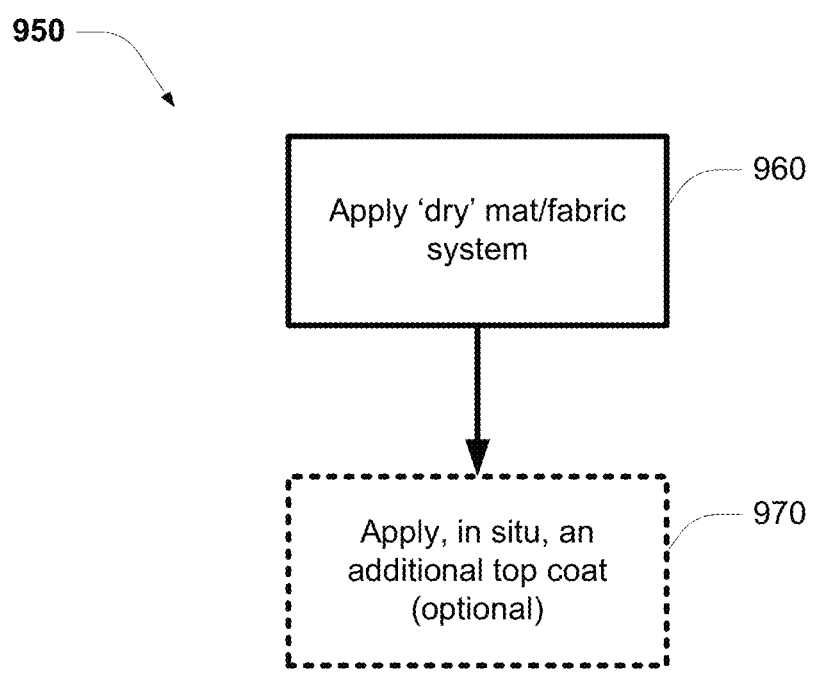
FIG. 10 is an example flowchart for a method of applying a peelable coating according to the invention.

Referring to FIG. 10, a method 950 of applying a peelable coating system (920 as shown in FIG. 9) to a substrate (910 as shown in FIG. 9). This method of application can comprise the steps of:

STEP 960: applying a pre-manufactured dry peelable coating system reinforcing layer atop the base layer;

STEP 970: applying (optional) a coating layer atop the reinforcing layer when in-situ.

It will be appreciated that the illustrated peelable coating, and method of application, can be used on a variety of floor substrates.

It will be further appreciated that peelable coating systems (for example 600 and 900) can be used to the temporary protection/curing of a substrate. This is particularly useful during a building construction phase. A peelable coating system can temporarily protect a variety of floor substrates including; concrete, stone, sealed timber, some linos, primed metals, tiles, and most sealed and non porous materials. The peelable coating system can be applied internally and externally for protecting the substrate from dirt, mud, grime, liquids, scratching, machinery, weather conditions, and heavy traffic—as generally found on domestic and commercial sites. The peelable coating system can be removed from the substrate by way of peeling back leaving substantially no residue.

Although the invention has been described with reference to specific examples, it will be appreciated by those skilled in the art that the invention may be embodied in many other forms.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected", along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, or that two or more elements are not in direct contact with each other but yet still co-operate or interact with each other.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

As used herein, unless otherwise specified the use of terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader, or with reference to the orientation of the structure during nominal use, as appropriate. Similarly, the terms "inwardly" and "outwardly" generally refer to the orientation of a surface relative to its axis of elongation, or axis of rotation, as appropriate.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

It will be appreciated that an embodiment of the invention can consist essentially of features disclosed herein. Alternatively, an embodiment of the invention can consist of features disclosed herein. The invention illustratively disclosed herein suitably may be practiced in the absence of any element which is not specifically disclosed herein.

What is claimed is:

1. A method of applying a peelable and temporary protective coating to a floor during a construction phase of a commercial or residential premises, the method including the steps of:
    applying a liquid to the floor for forming a base layer, the base layer being peelable from the floor when dry; and
    applying a pre-manufactured reinforcing layer atop the base layer while wet, and removing the base layer and reinforcing layer together after the phase.

2. The method according to claim 1, wherein the base layer comprises a modified pre-vulcanized natural rubber latex.

3. The method according to claim 1, wherein the base layer comprises a stabilized natural rubber latex.

4. The method according to claim 1, wherein the pre-manufactured reinforcing layer comprises a woven material.

5. The method according to claim 1, wherein the pre-manufactured reinforcing layer comprises a non-woven material.

6. The method according to claim 1, wherein the method further includes the step of: press rolling the reinforcing layer into the base layer while wet.

7. The method according to claim 6, wherein the coating comprising the base layer and reinforcing layer has a peelable property when dry.

8. The method according to claim 1, wherein the method further includes the step of:
    applying one or more upper coating layers.

9. The method according to claim 8, wherein each coating layer is applied atop the reinforcing layer when in-situ.

10. The method according to claim 8, wherein a first coating layer has a binder comprising any of one or more of the following: prevulcanised natural rubber latex, natural rubber latex, styrene/butadiene latex.

11. The method according to claim 10, wherein the first coating layer has a filler comprising any of one or more of the following: calcium carbonate, alumina tri-hydrate, silica fillers.

12. The method according to claim 10, wherein the first coating layer has a foaming agent in the form of potassium oleate, sodium lauryl sulphate or ammonium lauryl sulphate.

13. The method according to claim 10, wherein the first coating layer has a thickener in the form of poly acrylates or modified cellulose ethers.

14. The method according to claim 10, wherein a second coating layer is applied atop the first coating layer, the second coating layer having a binder comprising any of one or more of the following: prevulcanised natural rubber latex, natural rubber latex, acrylic, styrene/butadiene.

15. The method according to claim 14, wherein the second coating layer has a filler comprising any of one or more of the following: calcium carbonate, alumina tri-hydrate or silicas.

16. The method according to claim 14, wherein the second coating layer has a thickening agent comprising polyacrylates.

17. The method according to claim 10, wherein a second coating layer is applied atop the first coating layer, the second coating layer having an organic UV absorber.

* * * * *